Aug. 3, 1965  A. R. TOMLINSON  3,198,859
METHOD OF FORMING FOAMED PLASTIC ARTICLES
Filed June 4, 1963
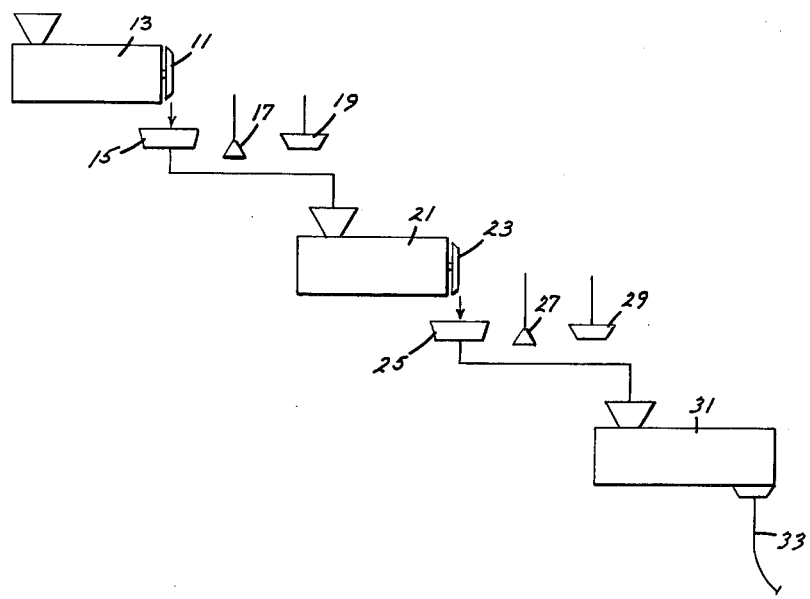

United States Patent Office 3,198,859
Patented Aug. 3, 1965

3,198,859
METHOD OF FORMING FOAMED
PLASTIC ARTICLES
Arthur R. Tomlinson, Garden City, Pa., assignor to Avisun Corporation, Philadelphia, Pa., a corporation of Delaware
Filed June 4, 1963, Ser. No. 285,359
5 Claims. (Cl. 264—55)

The present invention relates to an improved method of forming articles from foamed or expanded polyolefin materials by direct extrusion.

Generally, thermoplastic polymeric materials may be heated to a plastic or molten condition, foamed and expanded, and then extruded into articles of desired shape. The unexpanded polymeric material may be provided, for example, in the form of beads, pellets or other preformed particles which are coated or otherwise combined with a suitable chemical blowing agent. When such preformed particles are heated, the blowing agent generates a gas as it decomposes and thereby causes the polymeric material to foam and expand as it is converted into a molten condition. This expanded molten material may be then extruded and quenched to provide articles having a desired cellular structure.

With most expandable polymeric materials, the density of the foam, and the resulting extruded article, depends upon the amount of blowing agent which has been employed. Expandable polyolefin materials are an exception, however, since conventional extrusion procedures do not facilitate the formation of articles having a specific gravity of less than about 0.45, regardless of the amount of blowing agent used.

While a complete explanation is lacking, it appears that perhaps molten polyolefin materials cannot contain the expanding gas as rapidly as it is generated. Thus, when attempting to form polyolefin articles of such low specific gravity by direct extrusion, the expanding gas ruptures the surface of the molten material as it is extruded and causes collapse of some of the cellular structure. The polyolefin article which results usually exhibits a rough and porous surface and is of greater specific gravity than desired. Accordingly, a primary object is to provide a new or improved and more satisfactory method for forming articles of foamed polyolefin materials.

Another object is an improved method for forming articles having a low specific gravity from foamed or expanded polyolefin materials.

Stil another object is to provide an improved method of forming articles with a specific gravity of less than 0.4 from foamed or expanded polyolefin materials by direct extrusion.

These and other objects are accomplished in the present invention by a method in which foamed or expanded beads, pellets or other preformed particles of polyolefin materials are rendered molten and further expanded prior to being extruded into articles of desired shape. Preferably, the expanded particles are themselves formed by causing preformed particles of unexpanded polyolefin materials to be fused and foamed, and then extruded and shaped into particles.

Chemical blowing agents, carried by the preformed particles, serve to foam the polyolefin material during each of the two extrusion stages of this method. From the standpoint of simplicity, the blowing agents may be coated onto the surfaces of the preformed particles of polyolefin materials after such particles have been treated with surface wetting solutions or adhesives which exert no solvent action on the polymer itself.

agent employed will, of course, depend upon such factors as the particular polyolefin to be foamed, and the degree of foaming or expansion which is desired during each of the stages of the method. In general, the blowing agent selected should be compatible with the polyolefin material which is to be foamed, and should decompose at a temperature well below that which would degrade the polymer. While a different amount of blowing agent may be employed in each of the two stages of the method, in no instance should the blowing agent generate such an excess of expanding gas as to cause the same to rupture the surface and escape from the foamed material which is being extruded.

The two stage extrusion method described provides foamed polyolefin articles which have a more uniform and much finer cell structure than similar articles of comparable density formed by conventional processes. Of perhaps greater significance is that the method of the present invention facilitates the production of extruded polyolefin articles which have a specific gravity of less than about 0.4 and which exhibit no undesired rough and porous surfaces.

The articles produced by this method are well adapted for uses as thermal insulators and/or in applications where buoyancy is an important consideration. Further, in view of their uniform and fine cellular structure, the resulting articles are less fragile and can be expected to assume greater loads than comparable articles produced by conventional single stage extrusion systems.

The teachings of the present invention are, of course, useful with expandable or foamable polymeric materials other than polyolefins, especially where foamed articles having a fine cellular structure are desired. The primary merit of this method, however, is that it enables articles having a specific gravity of less than about 0.4 to be formed from foamed or expanded polyolefin materials by direct extrusion. Accordingly, the invention is hereafter described as employed in the manufacture of extruded articles formed from foamed or expanded polypropylene.

The single figure of the drawing diagrammatically illustrates the various stages of the method of the present invention.

In accordance with conventional practice, streams of molten polypropylene are cut into short sections by a rotating blade 11 as they issue from an extruder 13. These cut sections of the polypropylene streams are quenched as by sprays of cool water and are collected in a bin 15 as beads, pellets or other preformed particles. These unexpanded particles of polypropylene are sprayed at 17 with a surface wetting solution, coated with a conventional chemical blowing agent at 19, and then charged into a conventional extruder 21. The wetting solution, of course, renders the surfaces of the preformed polypropylene particles capable of retaining the chemical blowing agent and may consist of materials which are customarily employed for this purpose, such as mineral oil, polyisobutylene, ethylene glycol, etc. Further, while azodicarbonamide is normally employed as a blowing agent for polypropylene, blowing agents which are reactive at lower temperatures may be used. Examples of such blowing agents include N,N-dinitroso pentamethylene tetramine, which is commercially available from E. I. du Pont de Nemours & Company under the trademark of "Unicel N.D.," and PP'-oxy-bis (benzene sulfonyl hydrazide), which is sold by U.S. Rubber Co. under the name of "Calogen OT."

Within the extruder 21 the chemical blowing agent decomposes and thus generates a gas as the polypropylene particles themselves are heated to a molten condition. The molten polypropylene is caused to foam by the contained expanding gas and is then discharged from the extruder 21 as one or more shaped streams. A rotating blade 23 severs the extruded streams of polypropylene into sections of desired length which are then quenched and collected in a bin 25 as foamed or expanded beads, pellets or other preformed particles.

The now expanded particles of polypropylene are sprayed at 27 with a suitable surface wetting solution, containing mineral oil for example, and then coated at 29 with azodicarbonamide or other chemical blowing agent. These coated polypropylene particles are delivered into an extruder 31 where they are heated to a molten condition and extruded in the form of a desired article, as indicated at 33. During this final stage of the method, the gas generated during the decomposition of the blowing agent again serves to expand the molten polypropylene so that the resulting article 33 has a desired uniform and fine cellular structure.

The following example is presented to further illustrate the advantages of the described method.

Preformed pellets of unexpanded polypropylene were treated with a surface wetting solution containing 0.1% ethylene glycol, by weight, and then divided in samples denoted as A, B and C. The respective wetted samples A, B and C were coated with a chemical blowing agent consisting of 0.3%, 0.5%, and 0.7%, by weight, of azodicarbonamide which is commercially available from National Polychemicals, Inc. under the trademark of "Kempore R125." The coated samples were then separately melted within an extruder and shaped into particles by a conventional pelletizing process. The pellets formed from each of the original samples were of a foamed or expanded structure and had a specific gravity within the range of from 0.4 to 0.6.

These pellets of expanded polypropylene were then treated with a surface wetting solution containing 0.1% ethylene glycol, by weight, after which each of the samples was divided into three groups, designated as 1, 2 and 3. The respective groups 1, 2 and 3 of the different samples A, B and C were coated with a chemical blowing agent containing 0.3%, 0.5% and 0.7% of "Kempore R125" and then individually melt extruded into the form of a rod having a ⅛ inch diameter. In each instance, the formed rods had a uniform and fine cellular structure. The specific gravity of the different test rods was as follows:

| Sample | Percent Blowing Agent, First Coating Pass | Percent Blowing Agent, Second Coating Pass | Specific Gravity |
|---|---|---|---|
| A | | | |
| 1 | 0.3 | 0.3 | 0.51 |
| 2 | 0.3 | 0.5 | 0.46 |
| 3 | 0.3 | 0.7 | 0.45 |
| B | | | |
| 1 | 0.5 | 0.3 | 0.31 |
| 2 | 0.5 | 0.5 | 0.27 |
| 3 | 0.5 | 0.7 | (1) |
| C | | | |
| 1 | 0.7 | 0.3 | 0.31 |
| 2 | 0.7 | 0.5 | (1) |
| 3 | 0.7 | 0.7 | (1) |

[1] Rods exhibited an undesirable rough and porous surface, and thus indicated that the amount of blowing agent employed was excessive for the particular application.

It is to be understood that changes and variations may be made without departing from the spirit and scope of the invention as defined in the appended claims.

I claim:

1. A method of forming articles of low density from a foamable polyolefin material by extrusion including the steps of providing a foamed mass of molten polyolefin material and shaping the same into expanded particles, heating the shaped particles along with a gas generating agent to cause the polyolefin material to foam and expand as it assumes a molten condition, extruding the foamed and expanded molten polyolefin material as a stream of desired shape, and quenching the extruded shaped stream.

2. A method of forming articles from a foamable polyolefin material by extrusion including the steps of providing a foamed mass of molten polyolefin material and shaping the same into expanded particles, coating the shaped particles with a chemical blowing agent, heating the shaped, coated particles to decompose the blowing agent and cause the polyolefin material to foam and expand as it is rendered molten, extruding the foamed and expanded molten polyolefin material as a shaped stream of desired cross-section, and quenching the shaped stream to provide an article having a uniform and fine cellular structure.

3. A method of forming articles of low density from a foamable polyolefin material by extrusion including the steps of coating shaped particles of unexpanded polyolefin material with a chemical blowing agent, heating the coated particles to cause the polyolefin material to foam and expand as it is rendered molten, extruding the foamed molten material and shaping the same into expanded particles, coating the expanded particles with a chemical blowing agent, heating the expanded, coated particles to cause the polyolefin material thereof to foam and expand as it is rendered molten, extruding the foamed molten material as a shaped stream of desired cross-section and quenching the extruded stream.

4. A method as defined in claim 3 wherein the unexpanded and expanded particles of polyolefin material are treated with a wetting agent prior to coating the same with the chemical blowing agent.

5. A method of forming foamed articles from a polyolefin material including the steps of providing expanded particles of polyolefin material, heating the expanded particles of polyolefin material along with a chemical blowing agent to cause the polyolefin material to further expand as it assumes a molten condition, shaping the expanded, molten polyolefin material into the form of an article and quenching the shaped polyolefin material.

References Cited by the Examiner

UNITED STATES PATENTS

| | | | |
|---|---|---|---|
| 2,941,964 | 6/60 | Houston et al. | 260—2.5 |
| 2,989,782 | 6/61 | Barkhuff et al. | 264—53 XR |
| 3,089,857 | 5/63 | Pottenger | 264—53 XR |

FOREIGN PATENTS 854,586  11/60  Great Britain.

ALEXANDER H. BRODMERKEL, *Primary Examiner.*